Patented Aug. 12, 1952

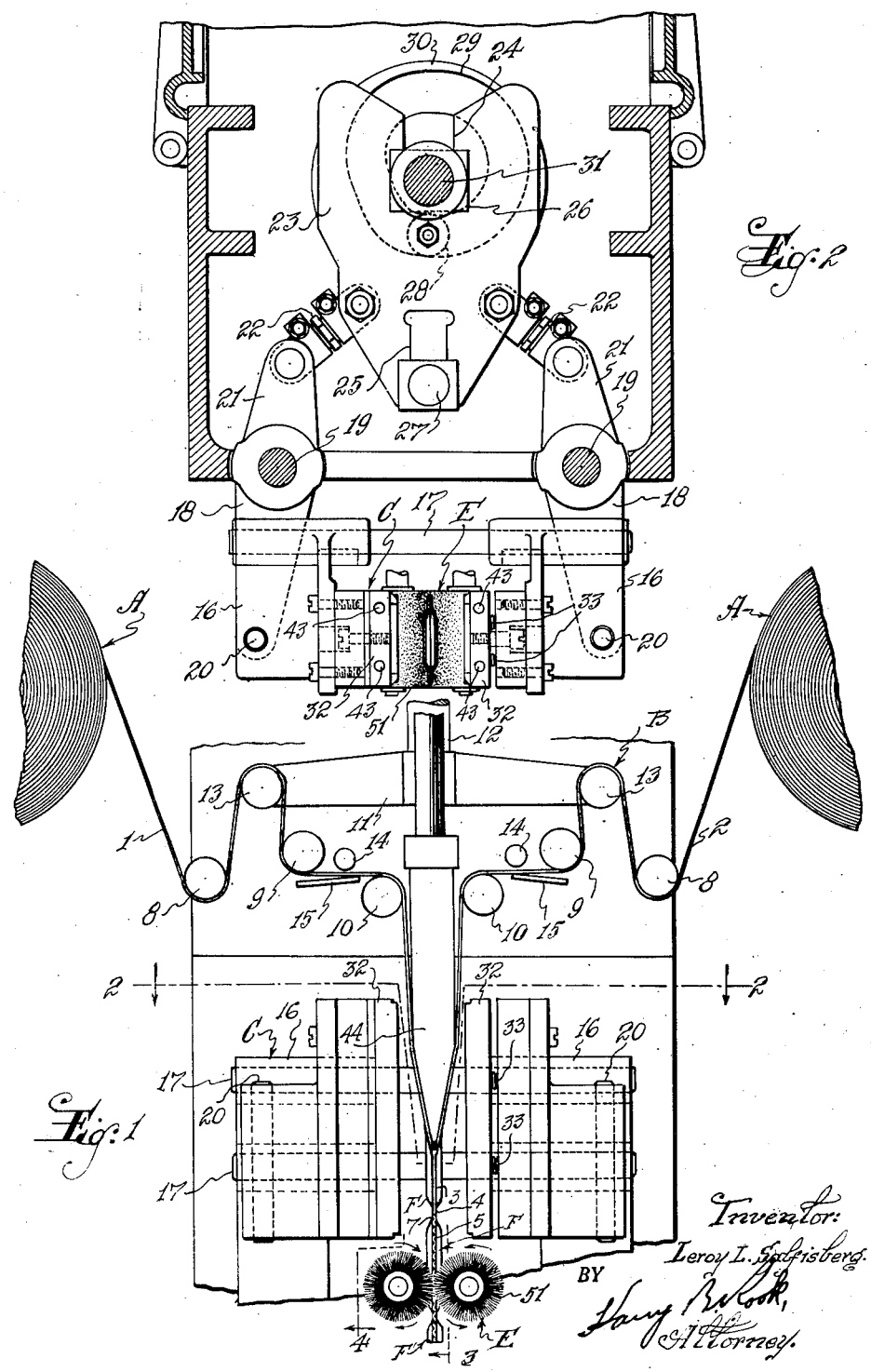

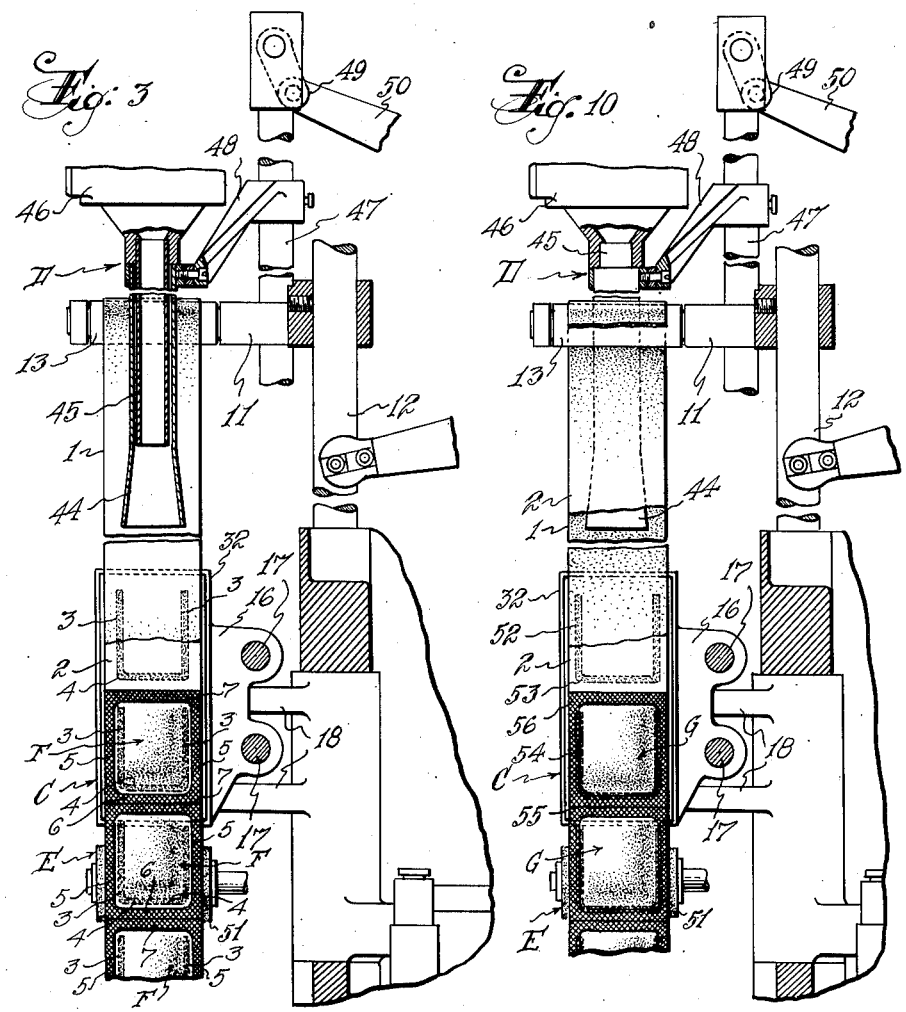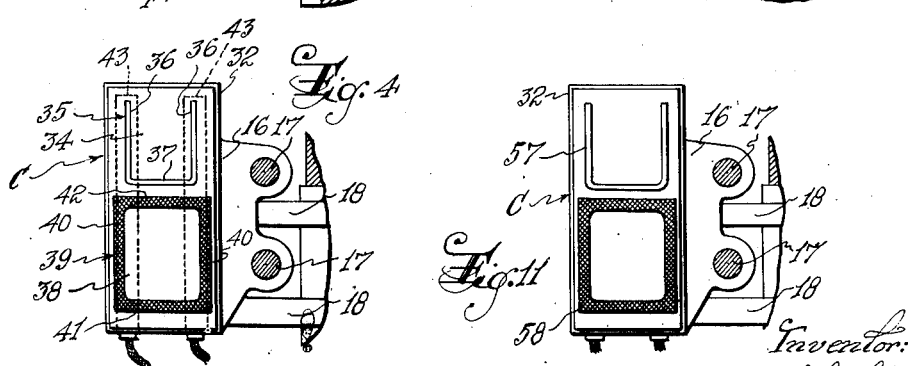

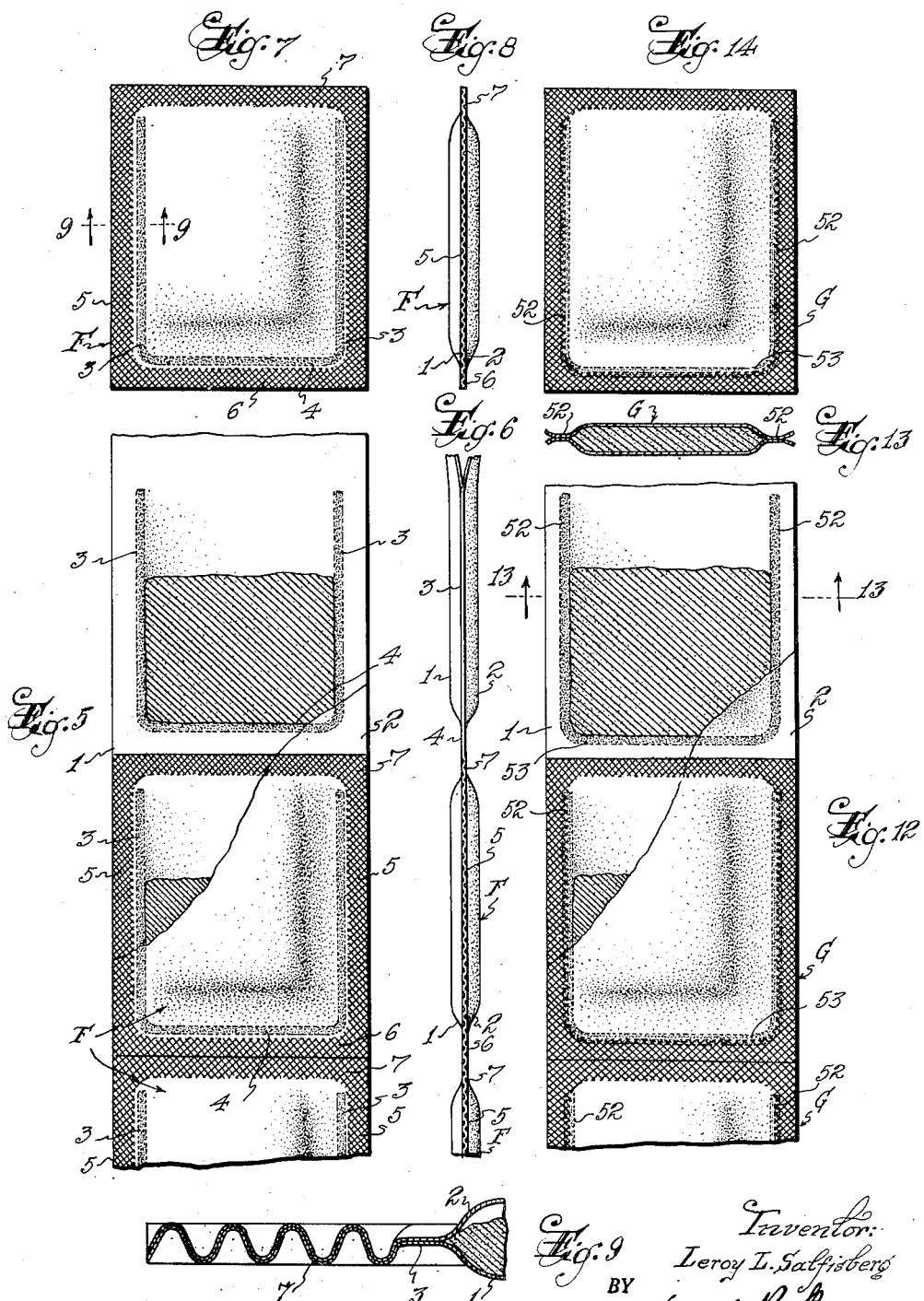

2,606,412

UNITED STATES PATENT OFFICE 2,606,412

METHOD OF MAKING SEALED PACKAGES

Leroy L. Salfisberg, South Orange, N. J., assignor to Ivers-Lee Company, Newark, N. J., a corporation of Delaware Application March 18, 1948, Serial No. 15,623

4 Claims. (Cl. 53—9)

1

This invention relates in general to the making and filling of packages from two layers of packaging material, for example, strips of cellophane, Pliofilm, metal foil, paper, or the like, and more particularly the invention contemplates a method of making such packages wherein two layers of packaging material are fed into juxtaposition and sealed together to form a bag having an upwardly facing open end after which an article or commodity is inserted into the bag and then the said open end of the bag is closed, a plurality of such bags or packages being made in succession from continuous strips of packaging material. In general, the invention relates to a package and machine of the general type shown in my Patents Nos. 2,245,827 and 2,350,930, dated June 17, 1941 and June 6, 1944, respectively. In the method set forth in these patents, the strips of material are moved through the machine between cooperative sealing dies with a step by step motion, and at the end of each step of movement, the dies press the strips together simultaneously along their longitudinal margins and transversely to form a rectangular bag-like container having an open end, the two sides and bottom of the bag being formed by the longitudinal and transverse seals, respectively, and the open end being formed between the unsealed portions of the strips at the upper ends of said longitudinal sealed zones. At the same time, the open end of the next preceding bag-like container is sealed by again sealing the strips transversely between the upper ends of said longitudinal sealed zones. With this method, the last-mentioned end of a given package is sealed at a different time and independently of the sealing of the strips together to form the other three sides of the package; the sealing is therefore not always as secure as it might be, and frequently the junctures of the longitudinal sealed zones and the transverse zones that close the previously open end of the package are visible and detract from the appearance of the package.

Therefore, one object of my invention is to provide a novel and improved package and a method of making it wherein the layers of packaging material may be initially sealed together to form a self-sustaining bag-like structure having an open end through which the bag is filled, and thereafter said layers may be sealed together to form simultaneously both longitudinal sealed zones and both transverse sealed zones, so that the final or permanent annular sealed zones of the package shall be formed at the same time, continuous or uninterrupted, of substantially uniform strength throughout, and neat and attractive in appearance.

Another object is to provide such a package and method wherein the initial sealed zones for forming the bag-like structure shall be practically invisible in the completed package.

Other objects, advantages and results of the invention will be brought out by the following description in conjunction with the accompanying drawings, in which Figure 1 is a fragmentary schematic front elevational view of apparatus for making a package according to the invention, showing the operation of filling one of the bag-like structures;

Figure 2 is a horizontal sectional view, approximately on the plane of the line 2—2 of Figure 1;

Figure 3 is a vertical sectional view, approximately on the plane of the line 3—3 of Figure 1, showing the parts after the bag-like structure shown in Figure 1 has been filled and permanently sealed and the next succeeding bag has been formed;

Figure 4 is a vertical sectional view, approximately on the plane of the line 4—4 of Figure 1, showing the face of one of the die blocks;

Figure 5 is an enlarged plan view of a portion of the package strip shown in Figure 3;

Figure 6 is an edge elevational view of the portion of the package strip shown in Figure 5;

Figure 7 is a plan view of a complete package after its severance from the package strip;

Figure 8 is an edge elevational view thereof;

Figure 9 is an enlarged fragmentary transverse sectional view, approximately on the plane of the line 9—9 of Figure 7;

Figure 10 is a view similar to Figure 3, showing a modification of the invention;

Figure 11 is a view similar to Figure 4, showing the modified die block that is illustrated in Figure 10;

Figure 12 is a view similar to Figure 5, showing the package strip illustrated in Figure 10;

Figure 13 is a transverse sectional view, on the plane of the line 13—13 of Figure 12, and Figure 14 is a plan view of the complete package after its severance from the strip shown in Figure 12.

Describing my method in its broader aspects, two strips 1 and 2 of suitable packaging material are drawn step by step from supply rolls A into juxtaposition or side by side relation by a feeding mechanism generally designated B.

At the end of each step of movement the two strips 1 and 2 are sealed together by sealing mechanism C along their longitudinal edges, as indicated at 3, and transversely, as indicated at 4, to form a bag-like receptacle having an open end or mouth facing upwardly between the strips and simultaneously said strips are sealed together along longitudinal and transverse margins 5 and 6 as well as transversely, as indicated at 7, of said open end of the next preceding bag-like receptacle that was formed at the end of the immediately preceding step of movement, so as to form a complete package F. In the interval between the steps of movement and after the partial formation of each package above described, the substance or article to be packaged is deposited by a filling mechanism D into the mouth of the preceding bag-like receptacle.

The feeding mechanism B draws from the rolls A at each step, predetermined quantities of the strips 1 and 2 required to form a single package, and an auxiliary feeding mechanism E constantly exerts tension on the strips so as to draw said quantities of the strips downwardly into proper position relative to the sealing means C, and at the same time moves the package strip or chain of packages downwardly into a severing mechanism (not shown) that may be similar to that shown in my Patent No. 2,350,930 which successively separates the packages from each other or from the strip.

It will be apparent to those skilled in the art that any suitable mechanism may be utilized for performing my method, but for the purposes of illustration, I have shown mechanism similar to that described and claimed in my Patent No. 2,350,930. For example, the feeding mechanism D includes two guide rollers 8 under which the respective strips 1 and 2 pass from the supply rolls A, and other idler rollers 9, one between each roller 8 and a pair of guide rollers 10. A yoke 11 is mounted on a vertically reciprocable shaft 12 and has a strip-pulling roller 13 disposed between the guide rollers 8 and idler rollers 9 at each side of the machine. Each strip of packaging material is led from the corresponding supply roll under the corresponding roller 8 over the corresponding pulling roller 13, under the corresponding idler roller 9 and downwardly over the corresponding guide roller 10, the two strips being thus brought into juxtaposition or opposed side by side relation to each other and guided toward the sealing means C. Between the rollers 9 and 10 are soft non-rotatable bars 14 each normally influenced by a spring (not shown) toward a corresponding brake platen 15 so as to positively clamp the corresponding strip 1 or 2 between the bar and the platen and hold the strip against longitudinal movement, so that periodically the strips 1 and 2 are held against longitudinal movement by the brake bars 14 and platen 15, when the yoke 11 is at the lower limit of its stroke and during upward movement of the yoke to cause a predetermined length of each strip required to form a package to be withdrawn from the corresponding roll A. Then the bars 14 are actuated upwardly to disengage them from the corresponding strips, as shown in Figure 1, after which the yoke 11 is lowered and simultaneously the auxiliary feeding means E draws the strips 1 and 2 downwardly through the sealing mechanism.

The sealing mechanism is shown as including two sealing jaws 16 that are mounted to reciprocate toward and from each other in a horizontal plane and are guided in accurate alinement with each other during their movements by guide rods 17 each of which is mounted in one of the jaws and is slidable in openings in the other jaw. Each jaw is carried by an arm 18 which is rotatably mounted on a vertical shaft 19 secured in the frame of the machine, the arm being pivotally connected to the jaw at 20. These arms are simultaneously oscillated to move the jaws alternately toward and from each other by the respective crank arms 21 connected by links 22 to a slide 23 that has slots 24 and 25 which slidably engage the respective guide blocks or pins 26 and 27. The slide carries a roller 28 that follows a cam groove 29 in a disc 30 which is keyed on a main drive shaft 31.

The two jaws 16 are substantially identical in construction, and each includes a body portion on which is mounted a crimping and sealing block 32 one of which is preferably movable toward and from the corresponding body portion and has its movement toward the body portion yieldingly resisted by springs 33 under the pressure exerted during the sealing operation of the packaging strips.

Each block 32 has a recess 34 in its face which is surrounded on three sides by a rim 35 the face of which is preferably smooth and flat. Where the package is to be approximately rectangular in shape as shown, the rim 35 is arranged in a manner corresponding to three sides of the rectangular package, as best shown in Figures 3 and 4. In the present instance, the package has the packaging material crimped and sealed along the four edges of the package and each sealing rim 35 has two vertically disposed parallel sealing surfaces 36 to grip the packaging strips inwardly of and parallel to the longitudinal edges thereof, and a horizontal sealing surface 37 to grip the packaging material strips transversely. Preferably, the length of the surface 36 is somewhat shorter than the corresponding sides of the package to be formed. Below the crimping and sealing rim 35 each sealing block has a recess 38 surrounded by a rectangular rim 39 the dimensions of which correspond approximately to the dimensions of the package to be formed, said rim including parallel corrugated or serrated vertical surfaces 40 to grip the longitudinal edge portions of the packaging strips, and parallel horizontal corrugated or serrated surfaces 41 and 42 to grip the sealing strips transversely.

In forming the packages, the sealing blocks 32 are first separated, as shown in Figures 1 and 2, and the packaging strips are pulled downwardly into juxtaposition between the sealing blocks. Thereupon, the sealing blocks are moved toward each other so as to cause the sealing surfaces 36 and 37 to press the strips together to form the zones 3 and 4 (see Figure 3) and partially fabricate a package or a bag-like structure having its upper end open between the strips at the upper ends of the sealing blocks, which because of the sealed zones is self-sustaining and simultaneously press the strips together to form the zones 5, 6 and 7 of the next preceding package (see Figure 3) and complete said package.

Where the strips 1 and 2 are of thermoplastic material or have a thermoplastic coating on their adjacent surfaces, the sealing blocks 32 will be heated in any suitable manner, for example, by electric heaters 43, to soften or fuse the thermoplastic material and seal the strips together. Where ordinary adhesive is used for sealing the strips together, the heaters may be omitted.

After the strips have been sealed as above described, the sealing blocks are separated and the portions of the packaging strips that will have been supplied by the feeding mechanism B for the next package will be pulled downwardly by the auxiliary feeding means E preparatory to the partial formation of the next package. Then the spout 44 of the filling mechanism D is quickly lowered into the open end of the partially completed package to deposit the material to be packaged, as shown in Figure 1. The spout is then withdrawn and the operations are repeated.

Any suitable mechanism may be provided for actuating the spout, for example, such as shown in my Patent No. 2,350,930, the spout 44 being telescopically reciprocable upon an outlet tube 45 of a hopper 46 from which predetermined quantities of the substance to be packaged are ejected by a suitable measuring and dispensing mechanism not here shown but which may be like that disclosed in my said patent. The spout is reciprocated by a vertically reciprocable shaft 47 that is connected by an arm 48 to the spout and is connected by a link 49 to a lever 50 that is operated in proper timed relation to the other parts for raising and lowering the spout.

As hereinbefore described, the package strip is constantly pulled downwardly by the auxiliary feeding means E to advance the strip as the packages are formed in succession, and as shown, said feeding means comprises two rotatable cylindrical brushes 51 which receive the package strip between them, the bristles yieldingly and frictionally exerting pressure on opposite sides of the strip so that as the brushes are rotated by any suitable means in the direction indicated by arrows in Figure 1, the package strip will be placed under tension and pulled downwardly. Simultaneously with each sealing operation one or more previously formed packages may be severed from the package strip by any suitable severing mechanism such as shown in my above-mentioned patent.

With the machine and method so far specifically described, the permanent sealed zones 5, 6 and 7 of each package are disposed wholly outside of the initially sealed zones 3 and 4 and are corrugated or crimped (see Figure 9), while the initially sealed zones 3 are smooth or flat. Obviously, the initially sealed zones 3 need be only sufficiently secured to withstand the filling of the package and they may become unsealed without any damage to the package or the contents thereof after the permanent seals 5, 6 and 7 have been formed.

A modification of the invention is shown in Figures 10–14, inclusive, wherein the initially sealed zones 52 and 53 are at least partially overlaid by the permanent sealed zones 54, 55 and 56. In other words, the permanent sealed areas are formed outwardly of the inner boundaries of the initially sealed zones. In this case, the sealing blocks will have the sealing surfaces 57 and 58 for forming the initial and permanent seals, respectively, in proper relation to each other to locate the sealed zones as described (see Figure 11).

It will be seen that in the specific form of package herein described, the initial sealed zones 3 and 4 are arranged to form a U-shaped seal, all portions of which are substantially continuous and uninterrupted, thereby producing a self-sustaining bag-like receptacle while the areas 5, 6 and 7 form an annular seal of rectangular shape, all portions of which are continuous and uninterrupted to hermetically and permanently seal said receptacle. This annular seal is therefore of uniform strength throughout and attractive in appearance. Moreover, the package has in effect double seals throughout the sealed portions except across the original mouth of the container, that is, across the ends of the initial zones 3; but where the initial zones are smooth and flat, as shown, they are substantially invisible.

While I have shown and described my method as including certain steps and the package structure as comprising certain details of construction, it will be understood by those skilled in the art that the steps in the method and the structure of the package may be modified within the spirit and scope of the invention.

Having thus described the invention, what I claim is:

1. A method of forming packages comprising feeding two continuous layers of packaging material longitudinally into juxtaposition step-by-step, sealing said layers together at the end of each step of movement in zones arranged to form a self-sustaining bag-like container having an upwardly facing mouth between said layers, depositing a substance to be packaged through said mouth into said container, and thereafter finally sealing said layers together simultaneously in a continuous annular area adjacent and approximately parallel to all of said zones and across said mouth to close the latter and complete a package, said final sealing of said layers being made outside said zones throughout the length of the latter.

2. A method of forming packages comprising feeding two continuous layers of packaging material longitudinally into juxtaposition step-by-step, sealing said layers together at the end of each step of movement in approximately parallel zones and in a zone connecting said parallel zones to form a self-sustaining bag-like receptacle having an upwardly facing mouth between said parallel zones, depositing a substance through said mouth into said receptacle, and thereafter finally pressing and sealing said layers together in a continuous annular area adjacent said sealed zones and across said mouth to close the latter and complete the package, said final sealing areas being formed outwardly of the inner boundaries of said zones.

3. A method as defined in claim 2, wherein said sealed zones are smooth and flat and the final sealing areas are crimped.

4. A method as defined in claim 2, wherein said sealed zones form a U-shaped seal and comprise spaced approximately parallel portions and a portion uninterruptedly connecting said parallel portions at one end, and said final sealing areas are arranged to form a rectangular seal and comprise spaced approximately parallel portions and other portions uninterruptedly connecting said parallel portions at their ends.

LEROY L. SALFISBERG.

REFERENCES CITED

The following references are of record in the file of this patent:

UNITED STATES PATENTS

| Number | Name | Date |
|---|---|---|
| 2,154,521 | Maxfield | Apr. 18, 1939 |
| 2,160,367 | Maxfield | May 30, 1939 |
| 2,162,230 | Salfisberg | June 13, 1939 |
| 2,234,655 | Salfisberg | Mar. 11, 1941 |
| 2,248,266 | Abrams | July 8, 1941 |
| 2,350,930 | Salfisberg | June 6, 1944 |
| 2,420,983 | Salfisberg | May 20, 1947 |
| 2,475,617 | Irmscher | July 12, 1949 |